UNITED STATES PATENT OFFICE.

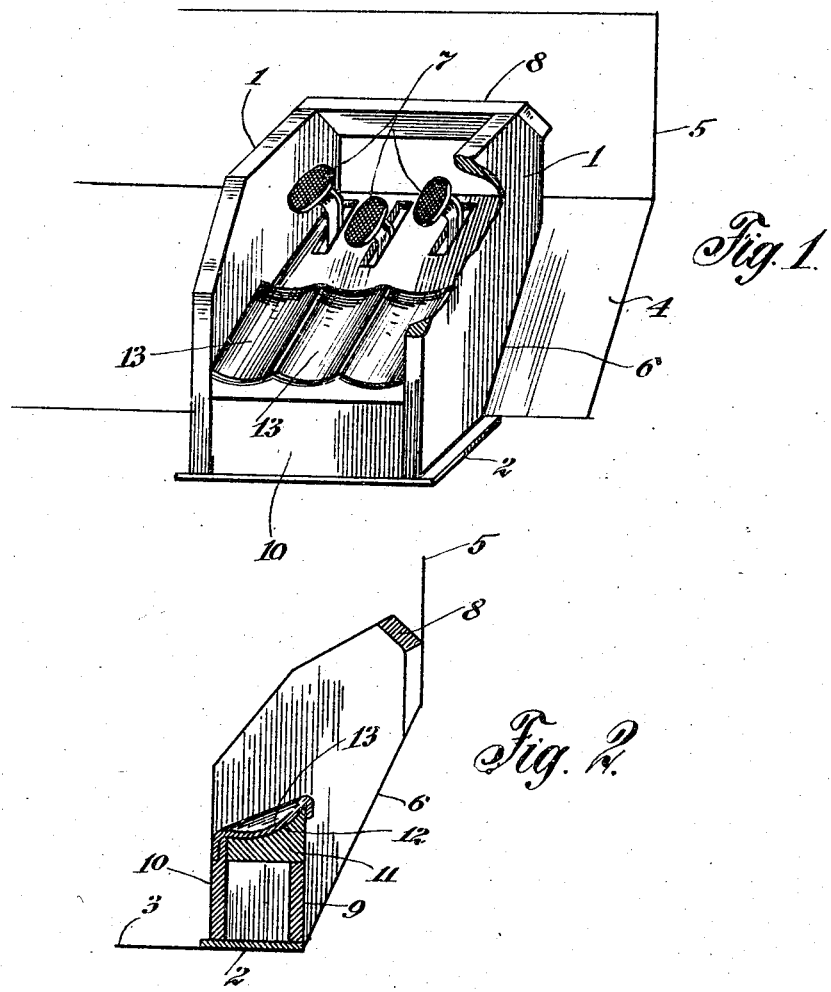

JACOB FISCHER, OF DETROIT, MICHIGAN.

FOOT-REST.

1,250,830.      Specification of Letters Patent.      Patented Dec. 18, 1917.

Application filed September 17, 1917. Serial No. 191,768.

*To all whom it may concern:*

Be it known that I, JACOB FISCHER, a citizen of the United States of America, residing at Detroit, in the county of Wayne and State of Michigan, have invented certain new and useful Improvements in Foot-Rests, of which the following is a specification, reference being had therein to the accompanying drawings.

This invention relates to a foot rest, and has special reference to a foot rest or support for the foot of a chauffeur or automobile operator, so that one or both feet may be conveniently held in proximity to the brake, clutch and reverse pedals of an automobile or similar vehicle.

The object of my invention is to provide a simple, durable and inexpensive box-like structure that may be easily placed upon the floor or lower part of the dash of an automobile to comfortably support one or both feet at the controlling pedals of the automobile, so that the feet of the chauffeur or automobile operator will always be in position to press or actuate one or more of the pedals. The foot rest has been designed to be easily and quickly installed in connection with a well known type of automobile, and the foot rest will retain the ball of a foot at a proper angle and in position so that a pedal may be quickly depressed or actuated.

I attain the above and other objects by a mechanical construction that will be hereinafter specifically described and then claimed, and reference will now be had to the drawing, wherein—

Figure 1 is a perspective view of a foot rest partially broken away, and

Fig. 2 is a vertical sectional view of the same.

The foot rest comprises a box like structure having parallel spaced side walls 1 and the lower edges of these side walls are secured to a base plate 2 that may be placed on and secured to the floor of an automobile body adjacent the inclined pedal board or lower portion 4 of a dash 5. The side walls 1 have the lower edges thereof beveled or inclined, as at 6 so as to conform to the inclination of the pedal board or lower portion of the dash, through which the usual brake, clutch and reverse pedals 7 extend.

The upper edges of the side walls 1 are also inclined and adjacent the rear edges of said walls is a transverse connecting bar 8 adapted to brace the upper edges of the side walls 1.

Connecting the side walls 1, at the base plate 2, are vertical parallel walls 9 and 10, the former being of less depth than the latter and both of said walls supporting a block 11 which has separate cavities 12 covered by a wear plate 13, said plate having the upper edge thereof bent downwardly at the rear side of the block 11 and the front edge thereof bent down and set into the vertical wall 10, as clearly shown in Fig. 2. The wear plate 14 affords individual foot rests in front of the pedals 7 and with the heels in the cavities of the wear plate the ball of one or both feet can be readily brought to bear upon the pedals to depress the same.

The foot rest in its entirety, can be finished to harmonize with the pedal board or dash of the automobile, and will prevent the feet from slipping off of the pedals when attempting to depress the same, thereby avoiding accidents.

One embodiment of my invention has been illustrated, but it is to be understood that the structural elements are susceptible to such changes, in size, shape and manner of assemblage, as fall within the scope of the appended claims.

What I claim is:—

1. A foot rest for the operator's feet of an automobile, comprising a boxlike structure adapted to be placed on the floor of an automobile at the dash thereof, said boxlike structure having side walls, a block between said side walls and a wear plate on said block providing individual cavities for the feet in proximity to the controlling pedals of an automobile.

2. A foot rest for the operator's feet of an automobile, comprising a boxlike structure adapted to be mounted on the floor of an automobile at the pedal board, said structure having side walls, vertical walls connecting said side walls, and a block carried by said vertical walls and adapted to support the operator's feet in proximity to the pedals.

3. A foot rest for the operator's feet of an automobile comprising a boxlike structure adapted to be placed on the floor of an automobile at the control pedals, said boxlike structure including side walls, vertical walls connecting said side walls, a block carried by said vertical walls and provided with individual cavities, and a wear plate on said block conforming to the cavities thereof and adapted to support an operator's feet in position to depress said pedals.

In testimony whereof I affix my signature in the presence of two witnesses.

JACOB FISCHER.

Witnesses:
  ROSE FISCHER,
  KARL H. BUTLER.

Copies of this patent may be obtained for five cents each, by addressing the "Commissioner of Patents, Washington, D. C."